(12) United States Patent
Watts et al.

(10) Patent No.: US 10,102,669 B2
(45) Date of Patent: Oct. 16, 2018

(54) DENSITY SAMPLING MAP LABELS

(71) Applicant: APPLE INC., Cupertino, CA (US)

(72) Inventors: Michael Marcel William Watts, San Francisco, CA (US); Erez Cohen, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/663,181

(22) Filed: Mar. 19, 2015

(65) Prior Publication Data

US 2016/0070984 A1 Mar. 10, 2016

Related U.S. Application Data

(63) Continuation-in-part of application No. 14/480,451, filed on Sep. 8, 2014.

(51) Int. Cl.
*G06T 17/05* (2011.01)
*G06F 17/30* (2006.01)

(52) U.S. Cl.
CPC ........ *G06T 17/05* (2013.01); *G06F 17/30244* (2013.01)

(58) Field of Classification Search
CPC ............................ G06T 17/05; G06F 17/30244
USPC .......................................................... 382/305
See application file for complete search history.

(56) References Cited

U.S. PATENT DOCUMENTS

| 6,405,129 | B1 | 6/2002 | Yokota |
| 6,542,814 | B2 | 4/2003 | Polidi et al. |
| 8,830,271 | B1 | 9/2014 | Jordan et al. |
| 2006/0123014 | A1* | 6/2006 | Ng ................... G06F 17/30864 |
| 2006/0287919 | A1 | 12/2006 | Rubens et al. |
| 2008/0270468 | A1* | 10/2008 | Mao .................. G06F 17/30241 |
| 2010/0191797 | A1* | 7/2010 | Seefeld ............... G06F 17/3087 |
| | | | 709/203 |
| 2012/0001938 | A1 | 1/2012 | Sandberg |
| 2012/0197524 | A1* | 8/2012 | Beyeler ............. G01C 21/3682 |
| | | | 701/426 |
| 2014/0074395 | A1 | 3/2014 | Brown |

OTHER PUBLICATIONS

Mennis, Jeremy, and Torrin Hultgren. "Intelligent dasymetric mapping and its application to areal interpolation." Cartography and Geographic Information Science 33.3 (2006): 179-194.*
"Density Calculations." Quantitative Decisions, May 28, 2013. Web. Accessed Dec. 13, 2017.*
Pandey et al., "Shuffling a Stacked Deck: The Case for Partially Randomized Ranking of Search Engine Results", Proceedings of the 31st VLDB Conference, Trondheim, Norway, 2005, 12 pages.
Feres Renato, "A few useful MATLAB functions", Math 350 Fall, 2012, 6 pages.

* cited by examiner

*Primary Examiner* — Geoffrey E Summers

(74) *Attorney, Agent, or Firm* — Invoke

(57) ABSTRACT

Sampling map labels is disclosed. A region of a map to be rendered is determined. It is determined that a first subregion is included in the region. Map labels associated with subregions in a neighborhood of the first subregion are analyzed to determine a regional density of map labels. Map labels associated with the first subregion are sampled based on the regional density of map labels.

15 Claims, 8 Drawing Sheets

DENSITY SAMPLING MAP LABELS

CROSS REFERENCE TO OTHER APPLICATIONS

This application is a continuation in part of co-pending U.S. patent application Ser. No. 14/480,451 entitled DENSITY SAMPLING MAP DATA filed Sep. 8, 2014, which is incorporated herein by reference for all purposes.

BACKGROUND OF THE INVENTION

When digitally displaying a map, the map often includes labels for map features (e.g., labels for countries, states, cities, streets, bodies of water, parks, schools, etc.) that must be rendered on a displayed region of the map. However, the number of labels to be rendered must be carefully selected such that pertinent information is displayed without overcrowding the rendered map region. For example, when a large number of map labels are to be displayed, the visual representations of the labels may end up overlapping each other and crowding map regions to obscure the labels and the underlying map. Traditionally, the subset of labels to be displayed on a map region has been preselected based on a zoom level of the map region. For example, as zoom level of the map is increased to zoom in to a smaller region, additional label categories preselected to be displayed for a particular zoom level are displayed. However, by predetermining and fixing labels to be displayed based only on zoom level, problems associated with over or under including labels to be displayed may still arise as density of labels vary over different map regions (e.g., urban region vs. rural region) of a map to be rendered. Additionally, when data to be labeled change, or the user input or background is to be used to determine which points to label in personalizing a map, it may be difficult to pre-select the labels to display. Therefore there exists a need for an efficient and effective way to select labels to be displayed on a map region.

BRIEF DESCRIPTION OF THE DRAWINGS

Various embodiments of the invention are disclosed in the following detailed description and the accompanying drawings.

Various embodiments of the invention are disclosed in the following detailed description and the accompanying drawings.

DETAILED DESCRIPTION

Figure 1:
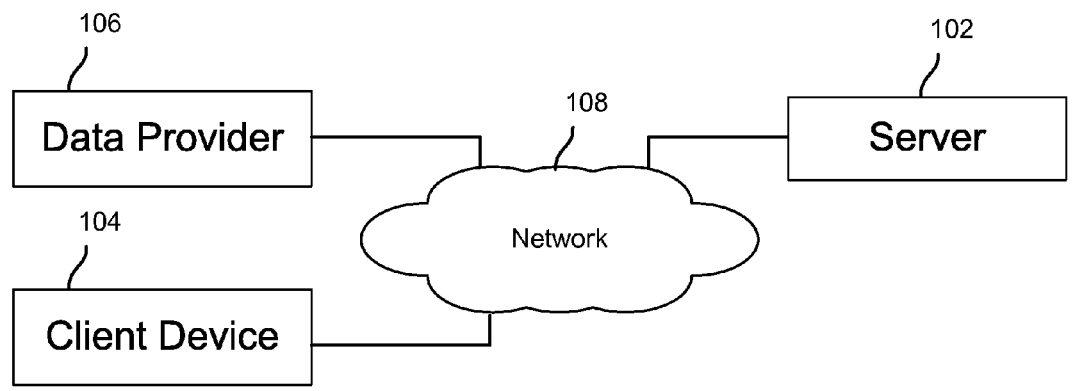
FIG. 1 is a block diagram illustrating an embodiment of an information rendering environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rendering information is disclosed. For example, maps labels are rendered on a map. In some embodiments, a region of a map to be rendered is determined. For example, a region of a map to be displayed is determined. Map labels associated with a first subregion that is included in the region are retrieved. For example, the map is divided into a plurality of subregions (e.g., non-overlapping map subregion tiles make up the map), and map labels (e.g., each map label includes a label text to be displayed at a specific location coordinate) of the first subregion that are of interest (e.g., labels identified by points of interest located in the first subregion) are retrieved. Map labels associated with subregions in the neighborhood of the first subregion are retrieved to determine a regional density of map labels for the first subregion. For example, map labels of interest that are located in one or more subregions adjacent to the first subregion are retrieved and the regional density of labels is determined by multiplying a desired reference label density by a total area of the subregions in the neighborhood of the first subregion and dividing by the total number of labels of interest in those subregions. The map labels associated with the first subregion are sampled based on the determined regional density of labels. For example, a subset of labels to be rendered from the labels associated with the first subregion is selected and the number of labels that are selected is based on the determined regional density of labels.

FIG. 1 is a block diagram illustrating an embodiment of an information rendering environment. Server 102 is connected to client device 104 and data provider 106 via network 108. In some embodiments, data provider 106 provides data to be processed and served by server 102. For example, data provider 106 provides a dataset of data points (e.g., each data point is associated with a geographical location) and server 102 processes the provided dataset to enable one or more users to analyze, sort, search, obtain, render, and/or visualize the dataset. Processing the dataset may include sorting data points of the dataset into groups corresponding to map subregions where each group of points belongs for efficient processing and data retrieval. Server 102 may store the processed provided data in a storage such as a local and/or network storage.

In some embodiments, data provider 106 provides map labels to be processed and served by server 102. For example, map labels of a map to be rendered by server 102 are provided by data provider 106. In some embodiments, map labels are already included in a base map stored on server 102 where data points provided by data provider 106 are to be plotted. In some embodiments, each map label is associated with one or more of the following: a location coordinate (e.g., rendering location), an applicable map type identifier, a text identifier of the map label, a category identifier, a relevance identifier, an associated keyword identifier, an associated time identifier, an associated demographic information, an associated user specific information, and other associated data. For example, each map label is stored in a data structure that associates and stores together the various information related to each map label. In some embodiments, map label items are sorted into groups corresponding to map subregions where each group of map label belongs for efficient processing and data retrieval. In some embodiments, map label items are processed to be ordered. For example, map label items are preordered in an order of relevance/importance determined based on an ordering function. Server 102 may store the processed map label items in a storage such as a local and/or network storage.

Client device 104 may request to server 102 data associated with the data provided by data provider 106 to server 102. For example, a user of client device 104 indicates that the user desires to view/render data points that meet specified search constraints (e.g., data points responsive to search query, data filters, etc.) on a selected map region, and the data points to be rendered are requested from server 102. When server 102 receives the request for the data points, server 102 may sample matching data points to provide a subset of the data points in a map region of interest that matches the request. The subset of the data points may be selected using a regional density of points (e.g., sampling rate) determined for a particular subregion. In some embodiments, the provided data points by server 102 are cached by client device 104 and client device 104 renders the provided data points on a displayed map. In the event a user of client device 104 modifies the request for the desired data points (e.g., changes a data filter), client device 104 determines whether the cached data points are sufficient to render the result of the request and requests new data points if the cached data points are not sufficient.

Client device 104 may request to server 102 to render a map region with map labels to server 102. For example, a user of client device 104 indicates that the user desires to view/render data points that meet specified search constraints (e.g., data points responsive to search query, data filters, etc.) on a selected map region, and map data including map labels to be rendered is requested. When server 102 receives the request to render a map region, server 102 may sample map labels within the map region to be rendered to provide a subset of the map labels located in a map region of interest. The subset of the map labels may be selected using a regional density of map labels (e.g., sampling rate) determined for a particular subregion. In some embodiments, the provided map labels by server 102 are cached by client device 104 and client device 104 renders the provided map labels on a displayed map. For example, each selected map label to be rendered is associated with a location coordinate and a text description of the map label is rendered at the location coordinate. In the event a user of client device 104 modifies the map region to be rendered (e.g., changes zoom level, moves map, etc.), client device 104 determines whether the cached map labels are sufficient to render the result of the request and requests new map labels if the cached map labels are not sufficient.

Examples of client device 104 and data provider 106 include a server, a personal computer, a desktop computer, an electronic reader, a laptop computer, a smartphone, a tablet computer, a mobile device, a wearable device, a wearable computer, and any other computer or electronic device. Examples of server 102 include any computer or a group of computers configured to provide data. Examples of network 108 include one or more of the following: a direct or indirect physical communication connection, mobile communication network, a cellular network, a wireless network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. Other communication paths may exist and the example of FIG. 1 has been simplified to illustrate the example clearly. Although single instances of components have been shown to simplify the diagram, additional instances of any of the components shown in FIG. 1 may exist. Components not shown in FIG. 1 may also exist to perform and provide functions and services described in this document.

Figure 2A:
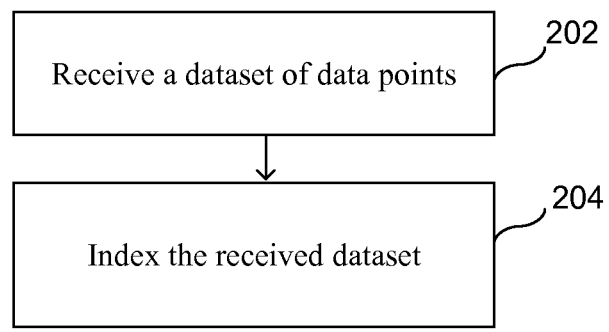
FIG. 2A is a flowchart illustrating an embodiment of a process for indexing data points.

FIG. 2A is a flowchart illustrating an embodiment of a process for indexing data points. The process of FIG. 2A may be implemented on server 102 of FIG. 1.

At 202, a dataset of data points is received. In some embodiments, the dataset includes data points that a data provider such as data provider 106 of FIG. 1 desires to enable rendering on a map. For example, the data provider provides data points and each data point is associated with one or more attributes/fields and a geographical location identifier (e.g., latitude and longitude location coordinate, axis coordinate, etc.). By plotting the geographical location coordinates of the data points of interest, a graphical pattern of the data points of interest may be determined. In one example, the dataset includes data points of crime incidents with attributes/fields such as time of the incident, type of incident, description of the incident, and indication of resolution of the incident as well as a location coordinate of where the incident occurred. By plotting crime incidents that are indicated as of interest by a user (e.g., crime incidents of a specific type that occurred at a specified time window, etc.), a geographical pattern of the crime incidents of interest may be determined. In some embodiments, examples of the dataset include database records, a table, a list, a chart, a spreadsheet, and any other data grouping. In some embodiments, the dataset is specific to a user account and only authorized users associated with the user account are able to access the dataset. The dataset may be provided periodically and/or dynamically. For example, the dataset is updated periodically and/or provided when new data or changed data is detected.

At 204, the received dataset is indexed. In some embodiments, indexing the received dataset includes analyzing, sorting, preprocessing, structuring, and/or sorting the dataset to enable portions of the dataset to be retrieved/rendered efficiently. In some embodiments, indexing the received dataset includes sorting data points/records of the dataset according to a geographical location of the data points/records. For example, a map is divided into subregions (e.g., rectangular area map tiles) and data points/records that belong to the same subregion (e.g., geographical location coordinate of the data point belongs in the subregion) are grouped together. In some embodiments, the map for each zoom level is divided into different subregions and a data record/point is sorted into a different corresponding grouping for each different zoom level. These groupings of data records may be saved and associated together in one or more data structures.

In some embodiments, indexing the dataset includes assigning a random number (e.g., a random number between and including zero and one) to each data point/record of the dataset as the sampling identifier of the data point/record. This random number may be utilized to efficiently and predictably sample the dataset. For example, in order to identify a random yet predictable ten percent of data points of the dataset, data points with sampling identifiers that are within a certain ten percent of the range of random numbers are identified. In some embodiments, the random sampling identifier is utilized in organizing the dataset in an ordered data structure (e.g., data points belonging to a particular subregion are stored in the same data structure). For example, the sampling identifier is utilized to store data points/records of the dataset in an ordered tree data structure (e.g., trie). By storing the data points/records of the dataset using their associated random numbers in a data structure ordered using the random numbers, range queries of the random numbers may be efficiently performed to obtain data records with associated random numbers in a desired range. In some embodiments, the dataset is stored in one or more ordered data structures organized using the associated subregion and associated sampling identifier of each data point/record of the dataset. For example, a separate data structure and/or separate data structure section exists for each different subregion (e.g., subregion of each map zoom level) and data points/records that belong to a specific subregion are stored in the corresponding data structure or data structure section in an order determined by the associated sampling identifier of each data record. In some embodiments, indexing the dataset includes precomputing the number of data points/records that belong to each subregion. For example, for a particular subregion, the total number of data points of the dataset that belong to the subregion and match constraints of various popular search queries is predetermined.

Figure 2B:
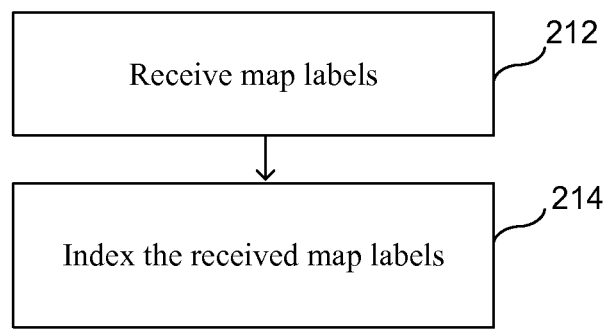
FIG. 2B is a flowchart illustrating an embodiment of a process for indexing map labels.

FIG. 2B is a flowchart illustrating an embodiment of a process for indexing map labels. The process of FIG. 2B may be implemented on server 102 of FIG. 1.

At 212, map labels are received. In some embodiments, the map labels are labels of a map on which data points that a data provider such as data provider 106 of FIG. 1 desires to render. For example, map labels label features of a map such as countries, states, cities, streets, roads, bodies of water, parks, schools, points of interest, event location, etc. In some embodiments, the map labels may be received from another server remote (e.g., data provider 106) to server 102 and/or may be stored in server 102. For example, the map labels are a part of a base map dataset stored in server 102.

In some embodiments, one or more map labels are associated with a location coordinate where the map label should be placed. For example, the map label identifies a label text to be displayed at a specific location coordinate. In some embodiments, one or more map labels are associated with a category identifier. For example, each map label is a member of one or more different label categories and a user may selectively select to enable or disable certain label categories from being displayed on a map. In some embodiments, one or more map labels are associated with an applicable map type identifier. For example, a map label may be only applicable to certain types of maps and the map type identifier identifies the types of maps of where the map label can be rendered. In some embodiments, one or more map labels are associated with an applicable keyword identifier. For example, descriptive keywords applicable to a map label may be associated with the keyword. In some embodiments, one or more map labels are associated with a time identifier. For example, a map label may be most applicable at certain time periods (e.g., road closed for a certain time period). In some embodiments, one or more map labels are associated with associated demographic information. For example, population size is associated with map labels to be able to distinguish which map labels are associated with a larger population size. In some embodiments, one or more map labels are associated with a relevance identifier. For example, the relevance identifier identifies a relative relevance between the map label for a particular map region, dataset to be rendered, a particular user, etc. In some embodiments, one or more map labels are associated with user specific information. For example, information only applicable to individual users is associated with the map label. In various embodiments, each map label may be associated with various other data.

In some embodiments, examples of the received map labels include database records, a table, a list, a chart, a spreadsheet, and any other data grouping including map label information. In some embodiments, the received map labels are specific to a user account. The map labels may be updated periodically and/or dynamically.

At 214, the received map labels are indexed. In some embodiments, indexing the received map labels includes analyzing, sorting, preprocessing, structuring and/or sorting the map labels to enable portions of the map labels to be retrieved/rendered efficiently. In some embodiments, indexing the received map labels includes sorting map labels according to a geographical location associated with the map label. For example, a map is divided into subregions (e.g., rectangular area map tiles) and map labels that belong to the same subregion (e.g., geographical location coordinate of the data point belongs in the subregion) are grouped together. In some embodiments, the map for each zoom level is divided into different subregions and map labels are sorted into a different corresponding grouping for each different zoom level. These groupings of map labels may be saved and associated together in one or more data structures. In some embodiments, the received map labels are indexed together with the dataset indexed in 204 of FIG. 2A.

In some embodiments, indexing the map labels includes assigning a sampling relevance identifier to each map label. This sampling relevance identifier may be utilized to efficiently and predictably sample the dataset. For example, in order to identify a prioritized and predicable subset of the map labels to be displayed, map labels with sampling relevance identifiers that are within a certain range are identified to be displayed. For example, it would be desirable to be able to display all applicable map labels of a given map region to be rendered. However, when a large number of map labels are to be displayed, the visual representations of the labels may end up overlapping each other and crowding map regions to obscure the labels and the underlying map or other data to be displayed. Because the total number of map labels available to be displayed and the density of map labels desired to be displayed may vary greatly based on the specific map section to displayed, the subset of available map labels to be displayed may be dynamically selected using the sampling relevance identifier. However, when sampling map labels to select the subset to be displayed, it may be desirable to select to display the most important/relevant map labels. In some embodiments, assigning the sampling relevance identifier includes using a relevance function that identifies the sampling relevance identifier of a map label provided as input. For example, the relevance function is an ordering function that can be used to order map labels in an order of display priority (e.g., higher priority map labels are selected to be displayed when sampling before lower priority map labels). In some embodiments, the relevance function may be provided a plurality of map labels as an input and the relevance function outputs an identifier of relative relevance between the input map labels.

In some embodiments, the relevance function may be utilized to automatically assign the sampling relevance identifier without human intervention. For example, a human user does not need to manually determine a display priority of map labels. In some embodiments, determining the sampling relevance identifier for each map label includes analyzing a reference data to automatically determine a relative priority of each map label. For example, using a reference data such as an encyclopedia or other knowledge reference set, a proxy for importance of a map label may be automatically determined by counting and comparing the number of times the descriptive text of the map label has been referenced in the reference data.

In some embodiments, the sampling relevance identifier is utilized in organizing the map labels in an ordered data structure (e.g., map labels belonging to a particular subregion are stored in the same data structure). For example, the sampling relevance identifier is utilized to store map labels in an ordered tree data structure (e.g., trie). In some embodiments, the map labels are stored in one or more ordered data structures organized using the associated subregion. For example, a separate data structure and/or separate data structure section exists for each different map subregion and map labels that belong to a specific subregion are stored in the corresponding data structure or data structure section in an order determined by the associated sampling relevance identifier of each map label. In some embodiments, indexing the map labels includes precomputing the number of map labels that belong to each map subregion.

Figure 2C:
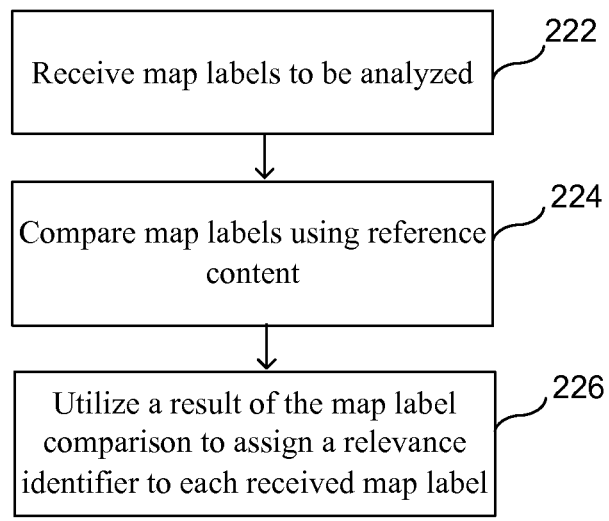
FIG. 2C is a flowchart illustrating an embodiment of a process for determining relative relevance between map labels.

FIG. 2C is a flowchart illustrating an embodiment of a process for determining relative relevance between map labels. The process of FIG. 2C may be implemented on server 102 of FIG. 1. In some embodiments, the process of FIG. 2C is included in 214 of FIG. 2B. For example, at least a portion of the process of FIG. 2C is used to determine the sampling relevance identifier for each received map label.

At 222, map labels to be analyzed are received. For example, the received map labels are map labels received in 212 of FIG. 2B.

At 224, map labels are compared using reference content. For example, the reference content includes at least a portion of articles of an online encyclopedia (e.g., Wikipedia) and relative relevance between map labels may be determined by determining prominence of label text of each map label in the encyclopedia articles. By utilizing the reference content to automatically determine the relative relevance, a human user is not required to manually review each map label to manually determine the relative relevance between the map labels. Examples of the reference content include an encyclopedia, an online collaborative encyclopedia, news content, a reference map, a website, a text book, an electronic book, a document, a search engine and any other content associated with map labels.

In some embodiments, the reference content is analyzed using the label texts of map labels. For example, the number of times the label text (or a variation of the label text) of each map label exists in the reference content is determined. In another example, the number of times the label text (or a variation of the label text) of each map label is referenced (e.g., referenced by a hyperlink) in the reference content is determined. In another example, a number and quality of links to a content page associated with each map label is determined.

At 226, a result of the map label comparison is utilized to assign a relevance identifier to each received map label. In some embodiments, a function and/or formula that utilizes as its input a result of the map label comparison performed using the reference content is utilized to assign a value indicative of the relevance of each map label. For example, the total number of times a label text of a map label is referenced/linked (e.g., hyperlinked) in the reference content is utilized to assign a relevance identifier value associated with the map label. In another example, the total number of times a label text of a map label is included in the reference content (e.g., mentioned in the reference content) is utilized to assign a relevance identifier value associated with the map label. In some embodiments, the function and/or formula that is utilized to assign the value indicative of the relevance of each map label also utilizes as its input one or more of the following associated with a map label to determine the relevance indicative value: a location coordinate, a category identifier, an applicable map type identifier, an associated keyword identifier, an associated time identifier, an associated demographic information, or associated user specific information. In some embodiments, the relative relevance identifier assigned to each received map label may be utilized to order the received map labels. For example, the received map labels are placed in an ordered data structure in an order identified by the relative relevance identifier.

Figure 3:
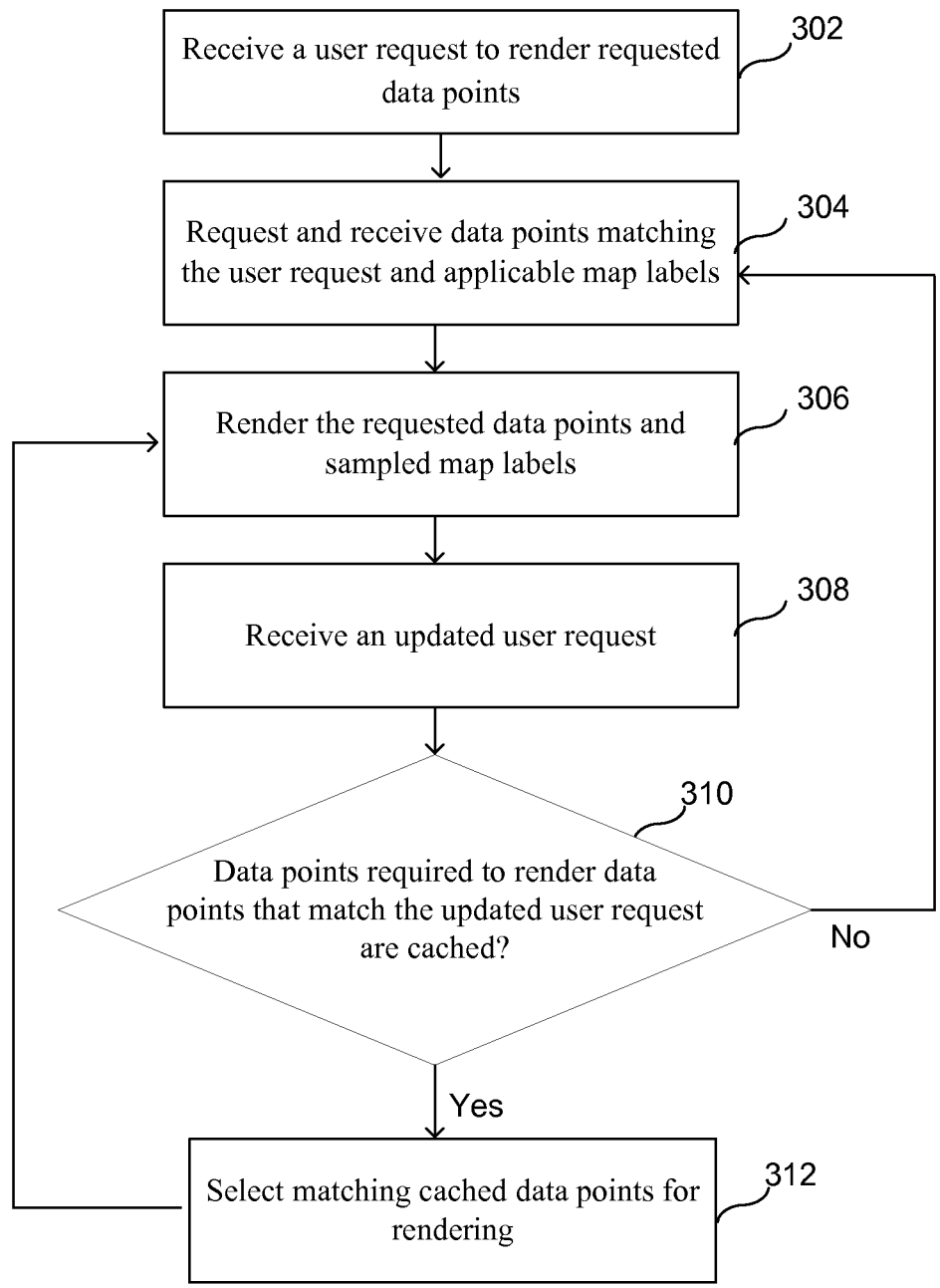
FIG. 3 is a flowchart illustrating an embodiment of a process for rendering requested data records.

FIG. 3 is a flowchart illustrating an embodiment of a process for rendering requested data records. The process of FIG. 3 may be implemented on client device 104 of FIG. 1.

At 302, a user request to render requested data points is received. The request may include an indication of a desired map region to be rendered, a map zoom level, and one or more constraints that identify desired data points to be rendered over the desired region. For example, a user specifies a search query and/or one or more data filters/data selections (e.g., check boxes, range sliders, drop down boxes, etc.) that data points must satisfy to be rendered along with a specification of a map region where the matching data points are to be rendered. In some embodiments, the specification of a map region is based on a map region navigated by a user. For example, an indication of a map region and configuration (e.g., zoom level, map detail layers, etc.) selected on a client device for display is provided.

At 304, data points matching the user request and eligible map labels are requested and received. For example, at least a portion of the user request of 302 is provided to a server (e.g., server 102 of FIG. 1) and the server provides data points that match the user request. In some embodiments, the received data points are for an indicated map region to be rendered. For example, the user request identifies a map region displayed on a client device display, and data points matching the user request and within the identified map region are received. In some embodiments, in addition to the matching data points, map labels to be rendered are received. In some embodiments, base map data is received. For example, a base map on which data points are to be rendered is received. The map data may include vector map data, map tile(s), point of interest, map features, map layers, map images, map controls, map overlays, map labels, etc. The base map data may be cached and/or saved for subsequent use.

In some cases when rendering a high concentration of visual representations of data points matching the user request, it may be difficult to discern each individual data point from each other in the concentrated region. Additionally, rendering a large number of visual representations of the data points may obscure the geographical distribution pattern of the data points. By sampling or reducing the number of data points to render to an optimal density, an optimal number of data points matching the user request may be efficiently rendered in a manner that visually preserves the geographic distribution of the matching data points.

In some embodiments, the received data points are a subset of data points that match the user request, and the subset has been selected based at least in part on a desired density of data points. For example, for an indicated map region, the data points that match the user request are determined and sampled to identify a subset of matched data points associated with a desired density of data points. A desired density may be specified as a number of data points per unit area. In some embodiments, the received data points have been sampled by taking into consideration distribution of data points surrounding a subregion of interest. For example, when selecting the number of data points to render in a certain map subregion, the numbers of data points in neighboring map subregions that also match the request are taken into consideration.

In some embodiments, the received map labels are a subset of eligible map labels that can be displayed on the map region of interest, and the subset has been selected based at least in part on a desired density of map labels. For example, for an indicated map region, the map labels that match the user request are determined and sampled to identify a subset of eligible map labels associated with a desired density of map labels. A desired map label density may be specified as a number of map labels per unit area. In some embodiments, the received map labels have been sampled by taking into consideration distribution of map labels surrounding a subregion of interest. For example, when selecting the number of map labels to render in a certain map subregion, the numbers of eligible map labels in neighboring map subregions are taken into consideration.

At 306, the requested data points and sampled map labels are rendered. In some embodiments, rendering the data points includes plotting a visual representation of each received matching data point at its corresponding geographical coordinate location on a map of an indicated map region. For example, dot markers representing the data points are plotted over a base map of an indicated map region displayed on a client device display. In some embodiments, controls to modify and/or indicate a new request for data points are provided. For example, data selection controls, filters, and query input boxes are provided as rendered user interface items.

In some embodiments, map labels for the indicated map region are rendered. For example, label text of the map labels is rendered at its corresponding geographical coordinate location on a map of the indicated map region. In some embodiments, controls to modify and/or indicate the amount, number, density, type, etc. of map labels to be rendered are provided. For example, data selection controls, filters, and query input boxes are provided as rendered user interface items. In some embodiments, in the event it is detected that one label text of one map label to be displayed overlaps label text of another map label to be displayed, the placement of the label text of one or more map labels is shifted/modified to remove the overlap.

At 308, an updated user request is received. The updated request may include an updated indication of a new desired map region to be rendered, a new map zoom level, and/or a request for new data points to be rendered. For example, a user may specify a new map region to be rendered, a new search query (e.g., description of desired location points), and/or a new configuration of one or more data filters/data selectors.

At 310, it is determined whether data points required to render data points that match the updated user request are cached. Determining whether data points that match the updated user request are cached includes determining whether the data points are cached at a client device. For example, data points received in response to one or more previous user requests are cached. In some embodiments, determining whether the updated user request matching data points are cached includes determining whether the updated user request at least includes all of the search constraints of a previous user request. For example, matching data points of a previous user request have been cached/saved and if the updated user request adds an additional data point search constraint (e.g., specifies an additional constraining data filter) in addition to the constraints of a previous user request, the cached data points of the previous user request can be additionally constrained/filtered locally to identify the matching data points of the updated user request. In some embodiments, if the updated user request is a broadening new user request that requests additional data points beyond cached data points, it is determined that required data points are not cached.

In some embodiments, determining whether required data points are cached includes determining whether the cached data points matching the updated user request satisfy a desired density of data points. For example, it is determined whether enough cached data points matching the updated user request exist in one or more map subregions. If it is determined that the desired density of data points is not satisfied for one or more map subregions to be rendered, it may be determined that the required data points are not cached.

If at 310, it is determined that the required data points are cached, at 312, the matching cached data points are selected for rendering and the selected data points are provided for rendering at 306. In some embodiments, selecting the matching cached data points includes sampling the matching cached data points using a determined sampling rate. For example, a subset of the matching cached data points is selected for rendering.

If at 310, it is determined that the required data points are not cached, the process returns to 304 where data points matching the updated user request are requested and received.

Figure 4A:
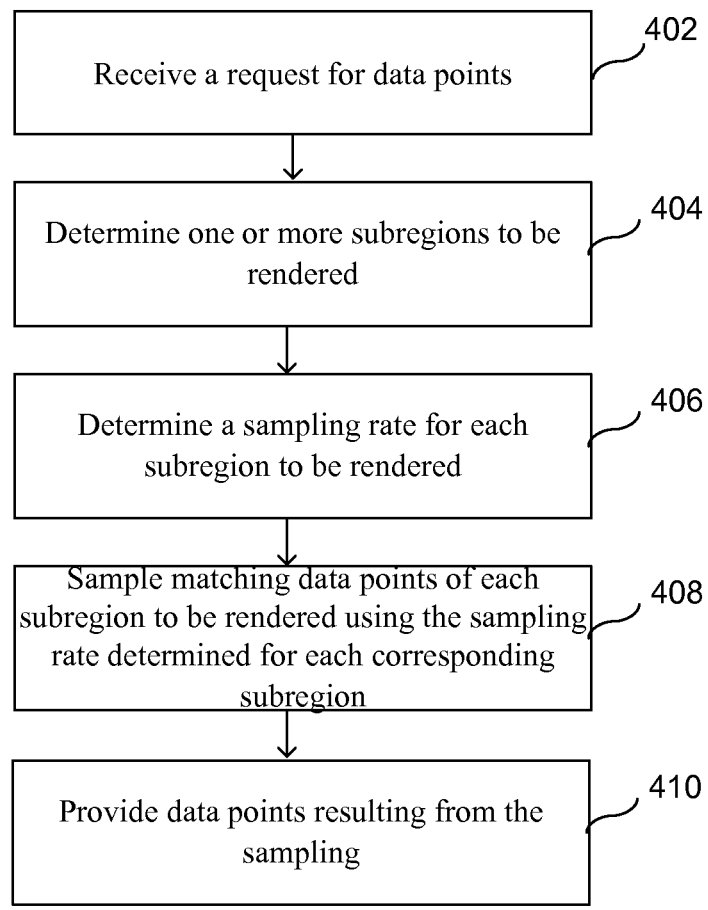
FIG. 4A is a flowchart illustrating an embodiment of a process for providing requested data points.

FIG. 4A is a flowchart illustrating an embodiment of a process for providing requested data points. The process of FIG. 4A may be implemented on server 102 of FIG. 1. In some embodiments, the process of FIG. 4A provides data points requested and received in 304 of FIG. 3.

At 402, a request for data points is received. In some embodiments, the request for data points is received from 304 of FIG. 3. The request may include an indication of a desired map/geographical region, constraints that match desired data points, a search query (e.g., description of desired location points), and/or an indication of one or more data filters/selections (e.g., check boxes, range sliders, drop down boxes, etc.) that identify matching data points to be rendered. In some embodiments, the received request includes a specification of a map region and map configuration (e.g., zoom level, map detail, etc.) based on a map region navigated by a user. For example, an indication of a map region and configuration selected on a client device display for rendering is received. In some embodiments, the request requests one or more data points received and indexed using the process of FIG. 2A.

At 404, one or more subregions to be rendered are determined. In some embodiments, determining the subregions includes determining a region of a map where desired points are to be located and rendered. In some embodiments, determining the subregions includes identifying one or more predetermined subregions identified by one or more received identifiers of a map region to be rendered. For example, each zoom level of a map has been divided into predetermined subregions (e.g., rectangular tiles) and each predetermined subregion is associated with presorted data points (e.g., presorted using the process of FIG. 2A), if any, that belong within the subregion. The request received in 402 may include one or more identifiers of the predetermined subregions where matching data points are to be located. In some embodiments, the one or more subregions to be rendered are associated with a map region to be displayed on a client device display. For example, determining the one or more subregions to be rendered includes determining which predetermined subregions correspond to the map region to be displayed on a client device.

At 406, a sampling rate is determined for each subregion to be rendered. In some embodiments, the sampling rate identifies a percentage of data points to be rendered. For example, the sampling rate indicates a desired portion amount of data points matching the received request that should be rendered and/or provided to be rendered. In some embodiments, determining the sampling rate includes utilizing a desired density factor. In some embodiments, the desired density factor identifies a desired baseline number of data points to render per unit area. The desired density factor may be received at 402, preconfigured, and/or dynamically determined (e.g., dynamically determined based on type of data point to be rendered, number of data points to be rendered, other data points rendered, client device display characteristics (e.g., screen size, number of pixels), map zoom level, specified by a user, etc.). In some embodiments, determining the sampling rate for a particular subregion of interest includes determining a total number of data points that match a received request in one or more neighboring subregions that include the subregion of interest and the total area of these subregions. For example, for each subregion to be rendered, a total number of data points that match the received request in the subregion to be rendered as well as in neighboring subregions is determined.

By taking into consideration the neighboring subregions, the sampling rate may remain proportional between nearby subregions. For example, a first subregion includes a large number of matching data points while a second adjacent subregion includes a small number of matching data points. In this example, if the subregions were sampled independently without taking their neighbors into consideration, the first subregion may be sampled to only a small number of matching data points while the second subregion may be sampled to render all of its points to maintain a similar target number of data points across all the rendered subregions. However, the first and second subregions are not visually comparable because they have been inconsistently sampled. In order to maintain a comparable and proportional sampling rate across neighboring subregions, the density of points in neighboring subregions may be taken into consideration when determining a sampling rate for a subregion. The neighboring subregions utilized when determining a sampling rate for a particular subregion may extend into subregions that are not to be rendered. In some embodiments, the sampling rate is a value between zero and one, inclusive. The sampling rate may be a percentage value.

In some embodiments, determining the matching data points in a subregion includes determining which data points belonging to the subregion satisfy a received request. For example, the received request includes a specification of search query and/or other constraints and data points that match the query and/or constraints are identified as data points that match the received request.

At 408, matching data points of each subregion to be rendered are sampled using the sampling rate determined for each corresponding subregion. In some embodiments, sampling the matching data points includes selecting a subset, if applicable, of the matching data points. For example, the sampling rate identifies a desired portion amount of the data points to select. In some embodiments, the sampling rate is a numeric value between zero and one, inclusive. In some embodiments, the sampling rate is a percentage value. In some embodiments, sampling the matching data points of a subregion includes randomly selecting a number of the matching data points that corresponds to the determined sampling rate. For example, a total number of matching data points is multiplied by the determined sampling rate and the resulting number of the matching data points is randomly selected from the matching data points of the subregion.

In some embodiments, sampling the matching data points of a subregion includes predictably selecting a random subset of matching data points, if applicable, using the determined sampling rate for the subregion. For example, by predictably selecting a random subset of matching data points, the same resulting data points from sampling can be repeatedly selected for the same received request and same sampling rate of a sampling.

In some embodiments, predictably selecting a subset of matching data points includes utilizing a data structure with data point entries that are each associated with a sampling identifier (e.g., random number). For example, the data structure determined in 204 of FIG. 2A is utilized. In some embodiments, sampling matching data points of a subregion to be rendered includes selecting data points in the data point data structure of the subregion that are associated with a sampling identifier that is within a range between zero and the determined sampling rate, inclusive. For example, the sampling identifier is a predetermined random number between zero and one, inclusive, and the sampling rate is also a number that can be between zero and one, inclusive. By selecting data points associated with a sampling identifier between zero and the sampling rate, the number of data points selected as compared to the total number of data points may correspond to a portion (e.g., percentage) indicated by the sampling rate (e.g., percentage of data points with an associated predetermined random sampling identifier within range of the sampling rate is statistically similar to the sampling rate). In some embodiments, sampling matching data points of a subregion to be rendered includes selecting data points in the data point data structure of the subregion that both match a received request (e.g., match a selection criteria/query) and are associated with a sampling identifier that is within a range identified by the determined sampling rate for the subregion.

In some embodiments, determining whether a sampling identifier is within a certain range includes performing a range query on using an ordered data structure that includes entries of data points associated with sampling identifiers. For example, a range query is performed using a trie data structure.

At 410, the data points resulting from the sampling are provided. For example, the data points resulting from the sampling selection in 408 are provided for rendering. In some embodiments, the selected data points are provided to be received in 304 of FIG. 3.

Figure 4B:
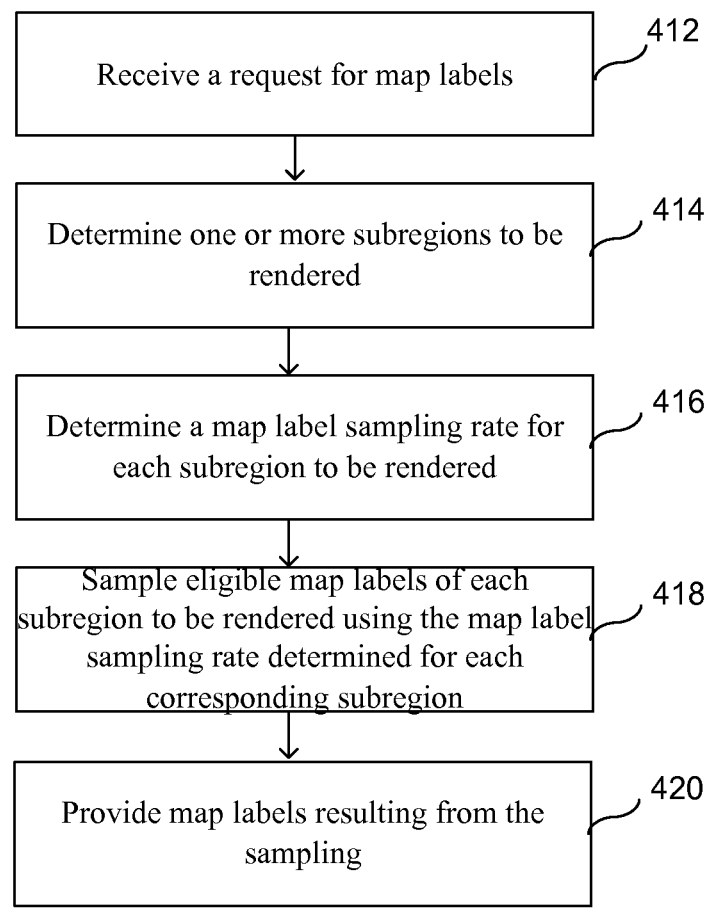
FIG. 4B is a flowchart illustrating an embodiment of a process for providing map labels to be rendered.

FIG. 4B is a flowchart illustrating an embodiment of a process for providing map labels to be rendered. The process of FIG. 4B may be implemented on server 102 of FIG. 1. In some embodiments, the process of FIG. 4B provides map labels requested and received in 304 of FIG. 3. In some embodiments, the process of FIG. 4B is included in the process of FIG. 4A. For example, data points and map labels of one or more subregions to be rendered are sampled together.

At 412, a request for map labels is received. In some embodiments, the request for map labels is received from 304 of FIG. 3. The request may include an indication of a desired map/geographical region, constraints of eligible map labels, and/or an indication of one or more map label filters/selections (e.g., check boxes, range sliders, drop down boxes, etc.) that identify desired map labels to be rendered. In some embodiments, the received request includes a specification of a map region and map configuration (e.g., zoom level, map detail, etc.) based on a map region navigated by a user. For example, an indication of a map region and configuration selected on a client device display for rendering is received. In some embodiments, the request requests one or more map labels received and indexed using the process of FIG. 2B.

At 414, one or more subregions to be rendered are determined. In some embodiments, 414 is included in 404 of FIG. 4A. In some embodiments, determining the subregion includes identifying one or more predetermined subregions identified by one or more received identifiers of a map region to be rendered. For example, each zoom level of a map has been divided into predetermined subregions (e.g., rectangular tiles) and each predetermined subregion is associated with presorted data points (e.g., presorted using the process of FIG. 2), if any, that belong within the subregion. In some embodiments, the one or more subregions to be rendered are associated with a map region to be displayed on a client device display. For example, determining the one or more subregions to be rendered includes determining which predetermined subregions correspond to the map region to be displayed on a client device.

At 416, a map label sampling rate is determined for each subregion to be rendered. In some embodiments, the map label sampling rate identifies a percentage and/or a number of eligible map labels to be rendered. For example, the map label sampling rate indicates a desired portion amount of eligible map labels located within the subregions to be rendered that should be rendered and/or provided to be rendered. In some embodiments, determining the map label sampling rate includes utilizing a desired map label density factor. In some embodiments, the desired density factor identifies a desired baseline number of map labels to render per unit area. The desired map label density factor may be received, preconfigured, and/or dynamically determined (e.g., dynamically determined based on types/categories of map labels to be rendered, number of eligible map labels to be rendered, population density of map region to be rendered, current time/date, data points rendered, client device display characteristics (e.g., screen size, number of pixels), map zoom level, specified by a user, etc.). In some embodiments, determining the map label sampling rate for a particular subregion of interest includes determining a total number of map labels in one or more neighboring subregions that include the subregion of interest and the total area of these subregions. For example, for each subregion to be rendered, a total number of map labels located in the subregion to be rendered as well as in neighboring subregions is determined.

By taking into consideration the neighboring subregions, the map label sampling rate may remain proportional between nearby subregions. For example, a first subregion includes a large number of map labels while a second adjacent subregion includes a small number of map labels. In this example, if the subregions were sampled independently without taking its neighbors into consideration, the first subregion may be sampled to render only a small number of map labels while the second subregion may be sampled to render all of its map labels to maintain a similar target number of map labels across all the rendered subregions. However, the first and second subregions are not visually comparable because they have been inconsistently sampled. In order to maintain a comparable and proportional map label sampling rate across neighboring subregions, the density of map labels in neighboring subregions may be taken into consideration when determining a map label sampling rate for a subregion. The neighboring subregions utilized when determining a map label sampling rate for a particular subregion may extend into subregions that are not to be rendered. The map label sampling rate may be a percentage value.

In some embodiments, determining the eligible map labels in a subregion includes determining which map labels belonging to the subregion are applicable to be rendered. For example, a user has specified specific categories of map labels desired to be rendered and/or not rendered and only map labels belonging to categories that are to be rendered are included in the eligible map labels. In another example, eligible map labels are selected based on a user preference and/or other user specific information. In some embodiments, eligible map labels are selected based at least in part on a search query and/or other constraints received in 402 of FIG. 4A to select data points to be rendered. For example, map labels to be rendered are selected based on keywords associated with each map label. In some embodiments, eligible map labels are selected based on an applicable map type identifier, an associated keyword identifier, an associated time identifier, an associated demographic information, and/or associated user specific information of map labels. For example, eligible map labels are selected based on a current time and map labels that are determined to be applicable for the current time are selected. In another example, eligible map labels are selected based on a population density of a map region of interest and map labels that are determined to be applicable for the population density are selected.

At 418, eligible map labels of each subregion to be rendered are sampled using the map label sampling rate determined for each corresponding subregion. In some embodiments, sampling the eligible map labels includes selecting a subset, if applicable, of the eligible map labels. For example, the map label sampling rate identifies a desired portion amount of the eligible map labels to select. In some embodiments, the map label sampling rate is a numeric value between zero and one, inclusive. In some embodiments, the map label sampling rate is a percentage value. In some embodiments, sampling the map labels of a subregion includes selecting a number of the eligible map labels that corresponds to the determined map label sampling rate. For example, a total number of eligible map labels is multiplied by the determined map label sampling rate and the resulting number of map labels is selected from the eligible map labels of the subregion.

In some embodiments, selecting map labels includes selecting the determined number of eligible map labels with the highest relevance identifier. For example, eligible map labels are selected in order of highest relative relevance (e.g., relative relevance determined using the process of FIG. 2C) until a desired number of map labels have been selected. In some embodiments, selecting a subset of eligible map labels includes utilizing a data structure with map label entries that are each associated with a sampling relevance identifier (e.g., determined using the process of FIG. 2C). For example, the data structure determined in 214 of FIG. 2B is utilized. In some embodiments, sampling eligible map labels of a subregion to be rendered includes selecting map labels in the map label data structure of the subregion that have been ordered based within the data structure based on the map label sampling identifier of each map label entry. For example, using the determined map label sampling rate, the total number of map labels to be selected for eligible map labels of a subregion has been determined and this total number of map labels is selected from the data structure in the order specified in the data structure. In some embodiments, sampling eligible map labels of a subregion to be rendered includes selecting map labels in the map label data structure of the subregion that both are determined to be eligible and are determined to be the most relevant.

In some embodiments, sampling the eligible map labels of a subregion includes predictably selecting a random subset of eligible map labels, if applicable, using the determined sampling rate for the subregion. In some embodiments, sampling eligible map labels of a subregion to be rendered includes selecting map labels in the map label data structure of the subregion that are associated with a map label sampling identifier that is within a range between zero and the determined map label sampling rate, inclusive. For example, the map label sampling identifier is a predetermined random number between zero and one, inclusive, and the map label sampling rate is also a number that can be between zero and one, inclusive. By selecting map labels associated with a sampling identifier between zero and the map label sampling rate, the number of map labels selected as compared to the total number of eligible map labels may correspond to a portion (e.g., percentage) indicated by the map label sampling rate (e.g., percentage of eligible map labels with an associated predetermined random sampling identifier within range of the map label sampling rate is statistically similar to the map label sampling rate). In some embodiments, determining whether a sampling identifier is within a certain range includes performing a range query on using an ordered data structure that includes entries of map labels associated with sampling identifiers. For example, a range query is performed using a trie data structure.

At 420, the map labels resulting from the sampling are provided. For example, the map labels resulting from the sampling selection in 408 are provided for rendering. In some embodiments, the selected map labels are provided to be received in 304 of FIG. 3.

Figure 5:
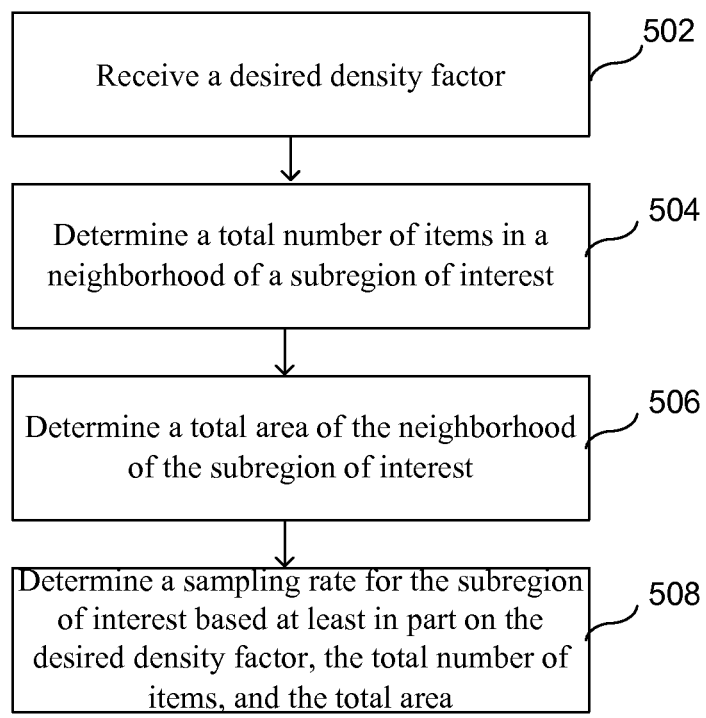
FIG. 5 is a flowchart illustrating an embodiment of a process for determining a sampling rate.

FIG. 5 is a flowchart illustrating an embodiment of a process for determining a sampling rate. The process of FIG. 5 may be implemented on server 102 of FIG. 1. In some embodiments, the process of FIG. 5 is included in 406 of FIG. 4A and/or 416 of FIG. 4B. In some embodiments, the process of FIG. 5 is utilized to determine a sampling rate for each subregion to be rendered. In some embodiments, the process of FIG. 5 is utilized to determine one or more sampling rates for data points and/or map labels to be rendered.

At 502, a desired density factor is received. In some embodiments, desired density factor is received in 402 of FIG. 4A and/or 412 of FIG. 4B. In some embodiments, the desired density factor identifies a desired baseline number of data points to render per unit area. In some embodiments, the desired density factor identifies a desired baseline number of map labels to render per unit area. The desired density factor may be preconfigured and/or dynamically determined (e.g., dynamically determined based on type of data point and/or map label to be rendered, number of data points and/or map labels to be rendered, other data points and/or map labels rendered, client device display characteristics, map zoom level, specified by a user, etc.).

At 504, a total number of items (e.g., data points and/or map labels) in a neighborhood of a subregion of interest is determined. In some embodiments, determining the total number of items includes determining the neighborhood of the subregion of interest. In one example, the neighborhood includes all adjacent subregions of the subregion of interest and the subregion of interest. In another example, the neighborhood includes all subregions within two (or another number in various embodiments) subregions away from the subregion of interest. In another example, the neighborhood includes all subregions within a predetermined distance or a dynamically determined distance away from the center of the subregion of interest. In another example, the neighborhood includes all subregions of a map. In various embodiments, the subregions included in a neighborhood of the subregion of interest may be preconfigured, indicated by a received identifier, and/or dynamically determined (e.g., dynamically determined based on map type, map region, type of data points to be provided, received request, client device type, network connection speed, network connection bandwidth, etc.).

In some embodiments, determining the total number of items includes summing the total number of data points that match a received request (e.g., matching a search query, data filters, constraints, etc.) in the subregions included in the neighborhood of the subregion of interest. The number of data points that match a received request in each subregion included in the neighborhood of the subregion of interest may be saved/cached for use in determining another sampling rate. In some embodiments, the number of matching data points in each subregion of the neighborhood is weighted when determining the total number of items. For example, data points belonging to a subregion closer to the subregion of interest are weighted greater than data points belonging to a subregion further away from the subregion of interest. This may allow data points closer to the subregion of interest to have a larger influence than data points further away.

In some embodiments, determining the total number of items includes summing the total number of determined to be eligible map labels in the subregions included in the neighborhood of the subregion of interest. The number of determined to be eligible map labels in each subregion included in the neighborhood of the subregion of interest may be saved/cached for use in determining another sampling rate. In some embodiments, the number of eligible map labels in each subregion of the neighborhood is weighted when determining the total number of items. For example, map labels belonging to a subregion closer to the subregion of interest are weighted greater than map labels belonging to a subregion further away from the subregion of interest. This may allow map labels closer to the subregion of interest to have a larger influence than data points further away.

At 506, the total area of the neighborhood of the subregion of interest is determined. For example, the total area of all the subregions included in the neighborhood determined in 504 is determined. In some embodiments, determining the total area includes determining the number of subregions included in the neighborhood. For example, if all subregions are equal in size, the number of subregions may be multiplied by the subregion area to determine the total area. In some embodiments, the determined area of each subregion in the neighborhood of the subregion of interest is saved/cached for use in determination of another sampling rate. In some embodiments, the area of each subregion in the neighborhood is weighted when determining the total area. For example, area belonging to a subregion closer to the subregion of interest is weighted greater than a subregion further away from the subregion of interest. This may allow subregions closer to the subregion of interest to have a larger influence than subregions further away. The area weight of each subregion may be the same or different than the count weight utilized in 504.

At 508, a sampling rate for the subregion of interest is determined based at least in part on the desired density factor, the total number of items, and the total area. For example, the desired density factor is multiplied by the weighted total area of the neighborhood and divided by the weighted total number of items of the neighborhood to determine the resulting sampling rate. In the event the resulting value is greater than one, the sampling rate may be set as one. In some embodiments, the sampling rate, r, is determined using the following calculation.

$$r = \min\left(d * \frac{\sum_{n \in N} w_n * a_n}{\sum_{n \in N} w_n * c_n}, 1\right)$$

In the above equation, d is the desired density factor (e.g., the desired number of points in a region of unit area), N is the neighborhoods of the subregion of interest, including the subregion of interest itself, n is the subregion within the neighborhood, $w_n$ is the weight for subregion n, $c_n$ is the number of desired items within n, and $a_n$ is the area of n. The min function ensures r has a maximum value of 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electronic device comprising:
a set of processing units; and
a non-transitory machine-readable medium storing a program for sampling map labels in a region of a map, the program comprising sets of instructions for:
determining a first subregion of the map region to be rendered;
determining a set of subregions in a neighborhood of the first subregion;
for each subregion in the set of subregions, applying a weight value to the subregion based on the subregion's distance from the first subregion, wherein more weight is applied to a subregion that is closer to the first subregion than a subregion that is farther from the first subregion;
analyzing map labels associated with the set of subregions in the neighborhood of the first subregion to determine a regional density of map labels, the regional density being based on a total weighted area of the set of subregions and a weighted total number of map labels of the set of subregions, where analyzing map labels includes:
calculating the weighted total area of the set of subregions by summing an area for each subregion in the set multiplied by the weight value applied to the subregion,
calculating the weighted total number of map labels of the set of subregions by summing a number of map labels of each subregion in the set multiplied by the weight value applied to the subregion, and
multiplying a desired density by the weighted total area of the neighborhood set of subregions and dividing by the weighted total number of map labels in the neighborhood of the set of subregions; and
sampling map labels associated with the first subregion based on the determined regional density of map labels, wherein a sampling rate for the map labels associated with the first subregion (i) is increased when the determined regional density of map labels decreases and (ii) is decreased when the determined regional density of map labels increases.

2. The electronic device of claim 1 further comprising a communication interface configured to provide the sampled map labels of the first subregion to a client device for rendering.

3. The electronic device of claim 1, wherein the first subregion is associated with a data structure that includes entries corresponding to map labels located within the first subregion.

4. The electronic device of claim 3, wherein the data structure is ordered using a relevance identifier assigned to each map label entry of the data structure.

5. The electronic device of claim 1, wherein the set of subregions in the neighborhood of the first subregion includes one or more subregions located adjacent to the first subregion.

6. The electronic device of claim 1, wherein the set of instructions for analyzing the map labels associated with the set of subregions comprises a set of instructions for determining, for each subregion in the set of subregions, a total number of map labels associated with the subregion that meet an eligibility criteria.

7. The electronic device of claim 1, wherein the set of instructions for analyzing the map labels comprises a set of instructions for determining the desired density.

8. A method for sampling, the method comprising:
determining a first subregion of a map region to be rendered;
determining a set of subregions in a neighborhood of the first subregion;
for each subregion in the set of subregions, applying a weight value to the subregion based on the subregion's distance from the first subregion, wherein more weight is applied to a subregion that is closer to the first subregion than a subregion that is farther from the first subregion:

analyzing map labels associated with the set of subregions in the neighborhood of the first subregion to determine a regional density of map labels, the regional density being based on a total weighted area of the set of subregions and a weighted total number of map labels of the set of subregions, where analyzing map labels includes:

calculating the weighted total area of the set of subregions by summing an area for each subregion in the set multiplied by the weight value applied to the subregion, calculating the weighted total number of map labels of the set of subregions by summing a number of map labels of each subregion in the set multiplied by the weight value applied to the subregion, and multiplying a desired density by the weighted total area of the neighborhood set of subregions and dividing by the weighted total number of map labels in the neighborhood of the set of subregions; and sampling map labels associated with the first subregion based on the determined regional density of map labels, wherein a sampling rate for the map labels associated with the first subregion (i) is increased when the determined regional density of map labels decreases and (ii) is decreased when the determined regional density of map labels increases.

9. The method of claim 8, wherein sampling the map labels comprises selecting map labels associated with the first subregion that have a highest relative relevance.

10. The method of claim 9, wherein the relative relevance for each map label is at least partly determined by automatically analyzing reference content.

11. The method of claim 8 further comprising providing the sampled map labels of the first subregion to a client device that renders the map region.

12. A non-transitory machine readable medium storing a program for execution by at least one processing unit, the program comprising computer sets of instructions for:

determining a first subregion of a map region to be rendered;

determining a set of subregions in a neighborhood of the first subregion;

for each subregion in the set of subregions, applying a weight value to the subregion based on the subregion's distance from the first subregion, wherein more weight is applied to a subregion that is closer to the first subregion than a subregion that is farther from the first subregion;

analyzing map labels associated with the set of subregions in the neighborhood of the first subregion to determine a regional density of map labels, the regional density being based on a total weighted area of the set of subregions and a weighted total number of map labels of the set of subregions, where analyzing map labels includes:

calculating the weighted total area of the set of subregions by summing an area for each subregion in the set multiplied by the weight value applied to the subregion, calculating the weighted total number of map labels of the set of subregions by summing a number of map labels of each subregion in the set multiplied by the weight value applied to the subregion, and multiplying a desired density by the weighted total area of the neighborhood set of subregions and dividing by the weighted total number of map labels in the neighborhood of the set of subregions; and sampling map labels associated with the first subregion based on the determined regional density of map labels, wherein a sampling rate for the map labels associated with the first subregion (i) is increased when the determined regional density of map labels decreases and (ii) is decreased when the determined regional density of map labels increases.

13. The non-transitory machine readable medium of claim 12, wherein the desired density is based on a user request.

14. The non-transitory machine readable medium of claim 12, wherein the desired density is based on a type of map labels to be rendered.

15. The non-transitory machine readable medium of claim 12, wherein the set of instructions for sampling the map labels comprises selecting map labels associated with the first subregion that have a highest relative relevance.

* * * * *